United States Patent [19]
Cantz

[11] 3,911,986
[45] Oct. 14, 1975

[54] ANTI-SKID ELEMENT FOR A VEHICLE TIRE

[75] Inventor: Rudolf Cantz, Stuttgart, Germany

[73] Assignee: Kennametal Inc., Latrobe, Pa.

[22] Filed: July 2, 1974

[21] Appl. No.: 465,253

Related U.S. Application Data

[62] Division of Ser. No. 303,316, Nov. 3, 1972, Pat. No. 3,831,665.

[52] U.S. Cl. ............................ 152/210; 152/210
[51] Int. Cl.² .................................. B60C 27/00
[58] Field of Search ........ 152/209 B, 210, 211, 212, 152/208

[56] References Cited
UNITED STATES PATENTS 3,464,476  9/1969  Scheuba et al. ............... 152/210
3,786,849  1/1974  Loquist ........................ 152/210

FOREIGN PATENTS OR APPLICATIONS
755,407  3/1967  Canada ........................ 152/210

Primary Examiner—Drayton E. Hoffman
Assistant Examiner—Larry H. Martin
Attorney, Agent, or Firm—Melvin A. Crosby

[57] ABSTRACT

An anti-skid element for a vehicle tire in which the radially inner end of the element is cushioned in the tire by a body of resistant material bonded thereto to control the force required to push the element radially inwardly into the tire.

3 Claims, 6 Drawing Figures

ANTI-SKID ELEMENT FOR A VEHICLE TIRE

RELATED APPLICATION

This application is a division of U.S. PAT. Ser. No. 303,316, Filed Nov. 3, 1972, Inventor Rudolf Cantz, Entitled "ANTI-SKID ELEMENT FOR A VEHICLE TIRE," and now U.S. PAT. No. 3,831,665.

The present invention relates to anti-skid elements for vehicle tires, sometimes referred to as tire studs or spikes, and is particularly concerned with and arrangement for controlling the amount of force required to push the stud radially inwardly into the tire tread after it is mounted therein.

The present invention is a Division of U.S. Ser. No. 303,316, filed Nov. 3, 1972, and disclosure of said application is incorporated herein by reference.

Anti-skid elements for vehicle tires, generally referred to as tire studs, consist of a body in the form of a cylindrical shank having a radial flange at one end forming the head for the stud and with a hard wear resistant pin mounted on the axis of the shank and projecting therefrom at the end of the shank opposite the head.

Such studs are mounted head end foremost into blind holes in the tread of a tire with the pin end of the shank about flush with the surface of the tire tread. By this arrangement, the hard wear resistant pin is caused to come into contact with a road surface on which the tire rolls and to engage the road surface in such a manner that it will penetrate hard snow and ice and therefore increase the grip of the tire in which it is mounted on the road surface.

The hard wear resistant pin generally consists of a carbide material such as tungsten carbide or a mixture of hard metal carbides with a suitable binder material, such as cobalt or the like cementing the carbide together.

A problem that has been encountered in tire studs of the nature referred to is that it is difficult to match the wear rate of the hard wear resistant pin to the wear rate of the tread material of the tire, and after the tires are run for a period of time, the pin may protrude from the tread an excessive amount, and it will cause the pin to slip on the roadway and to cause the stud to tilt on the tire thereby producing road wear and enhancing the possibility that the stud will become loose in the tire and drop therefrom.

BRIEF SUMMARY OF THE INVENTION

According to the present invention, a tire stud is provided in which the body has a cylindrical shank with a radial flange at one end forming the head of the stud and with a hard wear resistant pin mounted on the axis of the shank and protruding a short distance therefrom at the end of the stud opposite the head.

At this point, it should be noted that the present invention is not concerned with the specific manner of imparting wear resistance to the stud, and that the shank of the stud, at least in the region thereof opposite the head end thereof, could be caused to be wear resistant in some other manner, as by incorporating hard wear resistant material therein during the manufacture of the tire stud.

The tire stud is mounted head end foremost in a blind hole in the tread. The radially inner end of the stud extends to the bottom of the blind hole so that the stud is supported against radially inward movement into the tire tread. According to the present invention, a body of resilient material forms the radially inner end of the tire stud and engages the bottom of the blind hole in the tire tread in which the stud is mounted thereby to control the force which is required to push the stud radially inwardly into the tire tread.

This resilient material may take the form of a body of material of selected resiliency, such as rubber or the like, or it may take the form of a body having recesses therein to control the force required to compress the body. The body of resilient material can be mechanically separate from the remainder of the stud and is bonded thereto by a cementing agent.

With the foregoing in mind, a primary object of the present invention is the provision of an arrangement for radially supporting a tire stud in a tire tread in such a manner that the tire stud will move radially into the tire tread when the outer end of the stud engages a road surface, but at a controlled force such that the pin of the tire stud effectively engages the road surface.

Another object of the present invention is the provision of a tire stud and a supporting arrangement therefor in a tire tread which will substantially reduce the amount of wear on the road occasioned by the studs running thereon.

Another object is the provision of a tire stud and a supporting arrangement therefor in a tire tread which will permit the pin of the tire stud adequately to penetrate snow and ice formations, but which will, at the same time, permit the stud to move almost in its entirety into the envelope of the tire tread when the tire in which the stud is mounted is running on a dry road.

Another object is the provision of a tire stud and a mounting arrangement therefor which is relatively inexpensive and which is easy to employ.

A still further object is the provision of the combination of a tire tread and a stud mounted therein in which the stud is resiliently supported in the tire tread so as to be effective on snow and ice while the stud moves relatively freely into the tread in the radial direction when the tire is running on a dry road.

These and other objects and advantages of the present invention will become more apparent upon reference to the following detailed specification taken in connection with the accompanying drawings in which.

Figure 1:
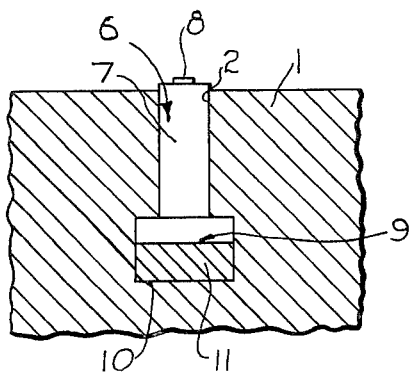
FIGS. 1 to 3 are sectional views through a tire tread showing studs mounted therein with elastic material at the radially inner end of the tire stud at the bottom of the hole or recess in the tire tread in which the stud is mounted.

DETAILED DESCRIPTION OF THE INVENTION:

FIGS. 1 to 6 show a tire 1 having a radial recess 2 therein which may have an enlarged inner end 3. The recess is formed in the resilient tread material 4 of the tire which is vulcanized to the cracass 5 of the tire.

The anti-skid element in FIGS. 1 to 6 indicated at 6 comprises a generally cylindrical shank 7 having a radial flange 9 at one end and having a hard wear resistant pin 8 mounted on the axis of shank 6 and protruding therefrom at the end thereof opposite flange 9. As will be seen in the drawings, the stud is mounted in the recess 2 provided therefor so that the radially outer end of the stud body is substantially flush with the surface of the tire tread. The stud is substantially the same in all of the views except for the configuration of the flange.

Figure 2:
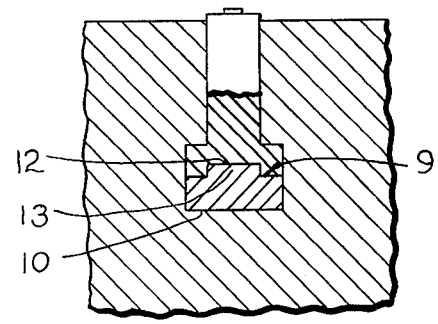
Figure 3:
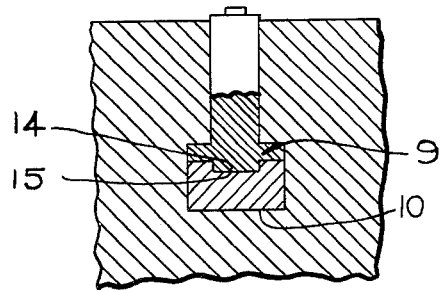

In FIGS. 1 to 3, a body 10 of resilient material forming a part of the stud is provided interposed between the flange 9 and the bottom of the recess in which the stud is mounted. Elastic body 10 is more resilient than the material of the tire tread and may, for example, be formed of an elastomeric material which will compress more readily than the extremely dense material of the tire tread.

In FIG. 1, resilient body 10 may be secured to the flange 9 by cement or by vulcanization and has the same diameter as flange 9. The juncture of body 10 and flange 9, indicated at 11, may, in this case, be planar.

In FIG. 2, flange 9 has a central recess 12 and resilient body 10 has a protrusion 13 thereon which extends into recess 12. As before, body 10 is secured to the flange 9 as by cement or vulcanization.

In FIG. 3, an arrangement is shown which is substantially the reverse of that shown in FIG. 2 in that the flange 9 has a protrusion 14 on the end of the shank has a protrusion 14 thereon while on the side of body 10 facing the flange 9 there is formed a recess 15 for receiving protrusion 14 with the body 10 being comented or vulcanized to the flange. The arrangements of FIGS. 2 and 3 provide considerable lateral stability to the stud in that it inhibits lateral movement of the flange 9 of the stud in the recess.

Figure 4:
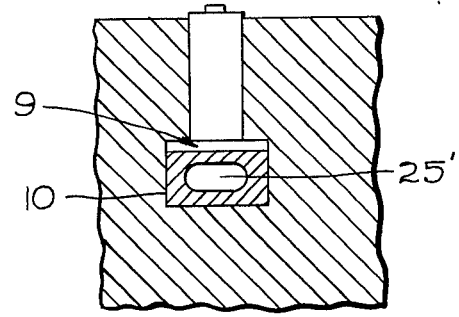
FIGS. 4 to 6 are sectional views showing an elastic material forming the radially inner end of the stud and having relieved regions therein for controlling the force at which the elastic material will compress.
Figure 5:
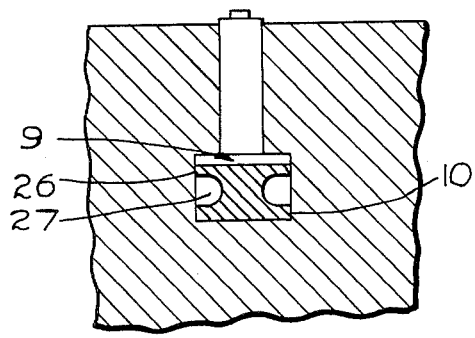
Figure 6:
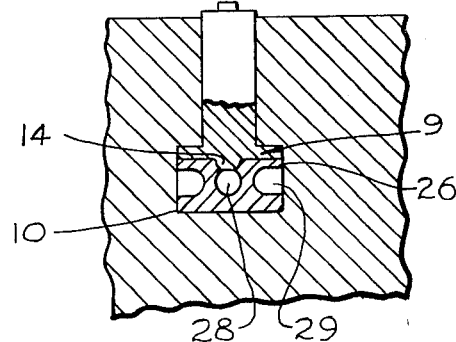

The several designs indicated in FIGS. 4 to 6 show how the resilient body 10 could be formed of a relatively high density material and the desired elastic characteristics imparted thereto through the use of hollow spaces and recesses and the like in the resilient material. The manner of connecting the body 10 to the flange 9 of the stud in FIGS. 4 to 6 correspond to what has already been described in connection with FIGS. 1 to 3 and will not, therefore, be described in detail.

In FIG. 4, the body of resilient material 10 is formed with a central cavity 25' which provides space into which the resilient material can move when the stud is pressed radially inwardly into its recess.

In FIG. 5, resilient body 10 is provided with an annular recess 27 in the circumferential surface 26 of the body of material.

In FIG. 6, stud body 9 has a central protrusion thereon at 14 corresponding to protrusion 14 in FIG. 4, and this is received in the mouth of and closes a hollow space 28 provided in body 10. Resilient body 10 also has a radially outwardly opening annular recess 29 formed in the peripheral surface 26.

The recesses in which the studs are mounted can all be provided at the time the tire is manufactured by providing mold pins in the tire mold which define the desired configuration in the tire tread. Such pins will pull out of the tread when the tread is cured. Each recess may have an enlarged region at the radially inner end to receive the stud head and the body of resilient material.

In general, the cylindrical portion of the recess in which the shank is to be received will be smaller in diameter than the shank of the stud, and when the stud is mounted in the tire, the portion of the recess is radially expanded by a suitable tool, and the stud is pushed into the recess. When the tool is removed, the tread material collapses and the stud shank is held tightly in the radial direction and the stud is thereby firmly supported in the tire tread.

Modifications may be made within the scope of the appended claims.

What is claimed is:

1. In a tire stud; a member comprising a shank having radial flange means at one end and having a hard wear resistant element mounted on the axis thereof at the other end, and a body of material more resilient than tire tread material engaging the side of said flange means which faces away from said shank, said body of material being coextensive with said flange means in the lateral direction, said body comprising at least one cavity therein to modify the resilience of said body in the axial direction, and means adhesively connecting said body of resilient material to said flange means.

2. A tire stud according to claim 1 in which said cavity includes an annular groove extending circumferentially around said body of material.

3. A tire stud according to claim 1 in which said cavity includes a central cavity formed in said body of material.

* * * * *